United States Patent
Johnson et al.

(10) Patent No.: US 8,211,496 B2
(45) Date of Patent: Jul. 3, 2012

(54) AMORPHOUS LITHIUM LANTHANUM TITANATE THIN FILMS MANUFACTURING METHOD

(75) Inventors: Lonnie G. Johnson, Atlanta, GA (US); Davorin Babic, Marietta, GA (US)

(73) Assignee: Johnson IP Holding, LLC, Atlanta, GA (US)

(*) Notice: Subject to any disclaimer, the term of this patent is extended or adjusted under 35 U.S.C. 154(b) by 950 days.

(21) Appl. No.: 12/163,044

(22) Filed: Jun. 27, 2008

(65) Prior Publication Data

US 2009/0004371 A1    Jan. 1, 2009

Related U.S. Application Data

(60) Provisional application No. 60/947,016, filed on Jun. 29, 2007.

(51) Int. Cl.
*B05D 5/00* (2006.01)
*B05D 5/12* (2006.01)
*H01M 4/02* (2006.01)
*H01M 4/13* (2010.01)

(52) U.S. Cl. ........... 427/126.3; 427/126.1; 427/126.2; 427/383.1; 427/383.3; 429/209

(58) Field of Classification Search ........... 427/126.1, 427/383.1, 126.2, 126.3, 383.3; 29/623.1; 429/209
See application file for complete search history.

(56) References Cited

U.S. PATENT DOCUMENTS

| | | | |
|---|---|---|---|
| 3,237,078 A | 2/1966 | Mallory | |
| 3,393,355 A | 7/1968 | Whoriskey et al. | |
| 4,303,877 A | 12/1981 | Meinhold | |
| 4,614,905 A | 9/1986 | Petersson et al. | |
| 4,654,281 A | 3/1987 | Anderman et al. | |
| 4,719,401 A | 1/1988 | Altmejd | |
| 4,777,119 A * | 10/1988 | Brault et al. | 430/296 |
| 5,270,635 A | 12/1993 | Hoffman et al. | |
| 5,291,116 A | 3/1994 | Feldstein | |
| 5,314,765 A | 5/1994 | Bates | |
| 5,336,573 A | 8/1994 | Zuckerbrod et al. | |

(Continued)

FOREIGN PATENT DOCUMENTS

DE    102007030604 A1    1/2009

(Continued)

OTHER PUBLICATIONS

J.B. Bates et al.; Rechargeable Thin-Film Lithium Batteries; Oak Ridge National Laboratory Publication; Aug. 1993.

(Continued)

*Primary Examiner* — Mark A Osele
*Assistant Examiner* — Christopher C Caillouet
(74) *Attorney, Agent, or Firm* — Panitch Schwarze Belisario & Nadel LLP

(57) ABSTRACT

An amorphous lithium lanthanum titanate (LLTO) thin film is produced by the sol-gel method wherein a polymer is mixed with a liquid alcohol to form a first solution. A second solution is then prepared by mixing a lanthanum alkoxide with an alcohol. The first solution is then mixed with the lanthanum based second solution. A lithium alkoxide and a titanium alkoxide are then also added to the lanthanum based second solution. This process produces a batch of LLTO precursor solution. The LLTO precursor solution is applied to a substrate to form a precursor layer which is then dried. The coating techniques that may be used include spin coating, spraying, casting, dripping, and the like, however, the spin coating technique is the preferred method recited herein.

30 Claims, 2 Drawing Sheets

U.S. PATENT DOCUMENTS

| | | | |
|---|---|---|---|
| 5,338,625 | A | 8/1994 | Bates et al. |
| 5,362,581 | A | 11/1994 | Chang et al. |
| 5,387,857 | A | 2/1995 | Honda et al. |
| 5,411,592 | A | 5/1995 | Ovshinsky et al. |
| 5,445,906 | A | 8/1995 | Hobson et al. |
| 5,455,126 | A | 10/1995 | Bates et al. |
| 5,512,147 | A | 4/1996 | Bates et al. |
| 5,561,004 | A | 10/1996 | Bates et al. |
| 5,567,210 | A | 10/1996 | Bates et al. |
| 5,569,520 | A | 10/1996 | Bates |
| 5,597,660 | A | 1/1997 | Bates et al. |
| 5,612,152 | A | 3/1997 | Bates |
| 5,654,084 | A | 8/1997 | Egert |
| 5,778,515 | A | 7/1998 | Menon |
| 5,783,928 | A | 7/1998 | Okamura |
| 5,811,205 | A | 9/1998 | Andrieu et al. |
| 5,821,733 | A | 10/1998 | Turnbull |
| 6,168,884 | B1 | 1/2001 | Neudecker et al. |
| 6,182,340 | B1* | 2/2001 | Bishop .................. 29/25.35 |
| 6,201,123 | B1* | 3/2001 | Daikai et al. ............. 546/21 |
| 6,242,129 | B1 | 6/2001 | Johnson |
| 6,387,563 | B1 | 5/2002 | Bates |
| 6,413,672 | B1 | 7/2002 | Suzuki et al. |
| 6,887,612 | B2 | 5/2005 | Bitterlich et al. |
| 7,540,886 | B2 | 6/2009 | Zhang et al. |
| 7,732,096 | B2 | 6/2010 | Thackeray et al. |
| 2001/0014505 | A1* | 8/2001 | Duncombe et al. ........... 438/286 |
| 2004/0081888 | A1 | 4/2004 | Thakeray et al. |
| 2006/0046149 | A1* | 3/2006 | Yong et al. .................. 429/251 |
| 2006/0287188 | A1* | 12/2006 | Borland et al. ............... 501/137 |
| 2007/0031323 | A1* | 2/2007 | Baik et al. ............... 423/594.12 |
| 2007/0148545 | A1 | 6/2007 | Amine et al. |
| 2007/0148553 | A1* | 6/2007 | Weppner ...................... 429/322 |
| 2007/0264579 | A1 | 11/2007 | Ota |
| 2009/0068563 | A1 | 3/2009 | Kanda et al. |
| 2009/0081555 | A1 | 3/2009 | Teramoto |
| 2009/0092903 | A1 | 4/2009 | Johnson et al. |
| 2010/0047696 | A1 | 2/2010 | Yoshida et al. |
| 2010/0203383 | A1 | 8/2010 | Weppner |
| 2011/0053001 | A1 | 3/2011 | Babic et al. |

FOREIGN PATENT DOCUMENTS

| | | |
|---|---|---|
| EP | 2037527 A1 | 3/2009 |
| JP | 2010-080426 A | 4/2010 |
| WO | 2009003695 A2 | 1/2009 |

OTHER PUBLICATIONS

Y. Inaguma et al.; High Ionic Conductivity in Lithium Lanthanum Titanate; Solid State Communications, vol. 86, No. 10, pp. 689-693; 1993.

O. Bohnke et al.; Mechanism of Ionic Conduction and Electrochemical Intercalation of Lithium into the Perovskite Lanthanum Lithium Titanate; Solid State Ionics 91 (1996) pp. 21-31.

P. Birke et al; Electrolytic Stability Limit and Rapid Lithium Insertion in the Fast-Ion-Conducting Li0.29La0.57TiO3 Perovskite-Type Compound; J. Electrochem. Soc., vol. 144, No. 6, Jun. 1997, The Electrochemical Society, Inc.

S. Stramare et al.; Lithium Lanthanum Titanates: A Review; Chem. Matter; 2003; 15. pp. 3974-3990.

Kai-Yun Yang et al.; Ionic to mixed ionic/electronic conduction transition of chemically lithiated Li0.33La0.56TiO3 at room temperature: Lithium-ion-motion dependent electron hopping; Applied Physics Letters 89, 024105 (2006).

Jun-Ku Ahn et al.; Characteristics of perovskite (Li0.5La0.5) TiO3 solid electrolyte thin films grown by pulsed laser deposition for rechargeable lithium microbattery; Electrochimica Acta 50 (2004) pp. 371-374.

Shin-Ichi Furusawa et al.; Ionic conductivity of amorphous lithium lanthanum titanate thin film; Solid State Ionics 176 (2005) pp. 553-558.

Jun-Ku Ahn et al.; Characteristics of Amorphous Lithium Lanthanum Titanate Electrolyte Thin Films Grown by PLD for Use in Rechargeable Lithium Microbatteries; Electrochemical and Solid-State Letters, 8 (2) A75-A78 (2005).

K. Kitaoka et al.; Preparation of La0.5Li0.5TiO3 perovskite thin films by the sol-gel method; Journal of Materials Science 32 (1997) pp. 2063-2070.

H. Jena et al.; Studies on the ionic transport and structural investigations of La0.5Li0.5TiO3 perovskite synthesized by wet chemical methods and the effect of Ce, Zr substitution at Ti site; Journal of Materials Science 40 (2005) pp. 4737-4748.

I.C. Popovici et al; Sol-gel preparation and characterization of perovskite lanthanum lithium titanate; J. Mater Sci (2007) 42; pp. 3373-3377.

Awaka et al, "Synthesis and structure analysis of tetragonal Li7La3Zr2O12 with the garnet-related type structure," Journal of Solid State Chemistry, vol. 182, No. 8, pp. 2046-2052 (2009).

Brinker et al, "SOL-GEL Science: The Physics and Chemistry of Sol-Gel Processing," Academic Press, pp. 21, 95, 453, 513, 675, 742, 787, and 837 (1990).

Cussen, "Structure and ionic conductivity in lithium garnets," Journal of Materials Chemistry, vol. 20, pp. 5167-5173 (2010).

Gao et al, "Sol-gel synthesis and electrical properties of Li5La3Ta2O12 lithium ionic conductors," Solid State Ionics, vol. 181, Nos. 1-2, pp. 33-36 (2009).

Geiger et al, "Crystal Chemistry and Stability of 'Li7La3Zr2O12' Garnet: A Fast Lithium-Ion Conductor," Inorganic Chemistry, vol. 50, pp. 1089-1097 (2011).

Kishida et al, "Microstructure of the LiCoO2 (cathode)/La2/3-xLi3xTiO3 (electrolyte) interface and its influences on the electrochemical properties," Acta Materialia, vol. 55, No. 14, pp. 4713-4722 (2007).

Laughlin et al, "Using Sol-Gel Chemistry to Synthesize a Material with Properties Suited for Chemical Sensing," Journal of Chemical Education, vol. 77, No. 1, pp. 77-78 (2000).

Murugan et al, "Fast Lithium Ion Conduction in Garnet-Type Li7La3Zr2O12," Angewandte Chemie International Edition, vol. 46, pp. 7778-7781 (2007).

Peters et al, "Ionic conductivity and activation energy for oxygen ion transport in superlattices—The multilayer system CSZ (ZrO2+CaO) / Al2O3," Solid State Ionics, vol. 178, Nos. 1-2, pp. 67-76 (2007).

Int'l Search Report issued Jan. 6, 2012 in Int'l Application No. PCT/US2011/046289; Written Opinion.

Drabold, "Topics in the theory of amorphous materials," The European Physical Journal B, vol. 68, pp. 1-21 (2009).

Billinge, "The nanostructure problem," Physics, vol. 3, No. 25, pp. 1-3 (2010).

Popovici et al, "Sol-gel preparation and characterization of perovskite lanthanum lithium titanate," Journal of Materials Science, vol. 42, pp. 3373-3377 (2007).

Goodenough et al, "Challenges for Rechargeable Li Batteries," Chemistry of Materials, vol. 22, No. 3, pp. 587-603 (2010).

Owen, "Rechargeable lithium batteries," Chemical Society Reviews, vol. 26, pp. 259-267 (1997).

Song et al, "Review of gel-type polymer electrolytes for lithium-ion batteries," Journal of Power Sources, vol. 77, pp. 183-197 (1999).

Li et al, "Synthesis and characterization of Li ion conducting La2/3-xLi3xTiO3 by a polymerizable complex method," Ceramics International, vol. 33, pp. 1591-1595 (2007).

Vijayakumar et al, "Synthesis of Fine Powders of Li3xLa2/3-xTiO3 Perovskite by a Polymerizable Precursor Method," Chemistry of Materials, vol. 16, No. 14, pp. 2719-2724 (2004).

Pham et al, "Synthesis and Characterization of Nanostructured Fast Ionic Conductor Li0.30La0.56TiO3," Chemistry of Materials, vol. 18, No. 18, pp. 4385-4392 (2006).

Allnatt et al, "Atomic transport in solids," Cambridge University Press, pp. ix-xiii (2003).

Elliott, "Physics of amorphous materials," Longman Scientific & Technical, Second Ed., pp. v-vi (1990).

Zallen, "The Physics of Amorphous Solids," Wiley-VCH, First Ed., pp. ix-xi (1983).

Huggins, "Advanced Batteries: Materials Science Aspects," Springer, First Ed., pp. xvii-xxx, 368-371 (2008).

West, "Basic Solid State Chemistry," John Wiley & Sons Ltd., Second Ed., pp. vii-xv, 346-351 (1999).

Ahn et al, "Characteristics of Amorphous Lithium Lanthanum Titanate Electrolyte Thin Films Grown by PLD for Use in Rechargeable Lithium Microbatteries," Electrochemical and Solid-State Letters, vol. 8, No. 2, pp. A75-A78 (2005).

Ahn et al, "Characteristics of perovskite (Li0.5La0.5)TiO3 solid electrolyte thin films grown by pulsed laser deposition for rechargeable lithium microbattery," Electrochemica Acta, vol. 50, pp. 371-374 (2004).

Ahn et al, "Effect of Li0.5La0.5TiO3 solid electrolyte films on electrochemical properties of LiCoO2 thin film cathodes with different rapid-thermal annealing conditions," Journal of Vacuum Science & Technology B, vol. 23, No. 5, pp. 2089-2094 (2005).

Xiong et al, "Effects of annealing temperature on structure and opt-electric properties of ion-conducting LLTO thin films prepared by RF magnetron sputtering," Journal of Alloys and Compounds, vol. 509, pp. 1910-1914 (2011).

Maqueda et al, "Structural, microstructural and transport properties study of lanthanum lithium titanium perovskite thin films grown by Pulsed Laser Deposition," Thin Solid Films, vol. 516, pp. 1651-1655 (2008).

Li et al, "Physical and electrochemical characterization of amorphous lithium lanthanum titanate solid electrolyte thin-film fabricated by e-beam evaportation," Thin Solid Films, vol. 515, pp. 1886-1892 (2006).

Furusawa et al, "Ionic conductivity of amorphous lithium lanthanum titanate thin film," Solid State Ionics, vol. 176, pp. 553-558 (2005).

U.S. Office Action issued Jan. 24, 2012 in U.S. Appl. No. 12/198,421.

Nagata et al, "All solid battery with phosphate compounds made through sintering process," Journal of Power Sources, vol. 174, pp. 832-837 (2007).

Sun et al, "High-strength all-solid lithium ion electrodes based on Li4Ti5O12," Journal of Power Sources, vol. 196, pp. 6507-6511 (2011).

Kotobuki et al, "Fabrication of Three-Dimensional Battery Using Ceramic Electrolyte with Honeycomb Structure by Sol-Gel Process," Journal of The Electrochemical Society, vol. 157, No. 4, pp. A493-A498 (2010).

Machida et al, "All-Solid-State Lithium Battery with LiCo0.3Ni0.7O2 Fine Powder as Cathode Materials with an Amorphous Sulfide Electrolyte," Journal of The Electrochemical Society, vol. 149, No. 6, pp. A688-A693 (2002).

Lee et al, "The production of LiCoO2 cathode thick films for an all-solid-state microbattery," Journal of Ceramic Processing Research, vol. 8, No. 2, pp. 106-109 (2007).

Oh et al, "Ionomer Binders Can Improve Discharge Rate Capability in Lithium-Ion Battery Cathodes," Journal of The Electrochemical Society, vol. 158, No. 2, pp. A207-A213 (2011).

Kotobuki et al, "Compatibility of Li7La3Zr2O12 Solid Electrolyte to All-Solid-State Battery Using Li Metal Anode," Journal of The Electrochemical Society, vol. 157, No. 10, pp. A1076-A1079 (2010).

Xu, "Nonaqueous Liquid Electrolytes for Lithium-Based Rechargeable Batteries," Chemical Reviews, vol. 104, pp. 4303-4417 (2004).

Ramzy et al, "Tailor-Made Development of Fast Li Ion Conducting Garnet-Like Solid Electrolytes," Applied Materials & Interfaces, vol. 2, No. 2, pp. 385-390 (2010).

Kokal et al, "Sol-gel synthesis and lithium ion conductivity of Li7La3Zr2O12 with a garnet-related type structure," Solid State Ionics, vol. 185, pp. 42-46 (2011).

Kim et al, "Characterization of the interface between LiCoO2 and Li7La3Zr2O12 in an all-solid-state rechargeable lithium battery," Journal of Power Sources, vol. 196, pp. 764-767 (2011).

Nimisha et al, "Chemical and microstructural modifications in LiPON thin films exposed to atmospheric humidity," Solid State Ionics, vol. 185, pp. 47-51 (2011).

Sanchez et al, "Chemical Modification of Alkoxide Precursors," Journal of Non-Crystalline Solids, vol. 100, pp. 65-76 (1988).

U.S. Appl. No. 13/410,895, filed Mar. 2, 2012.

Glass et al, "Ionic conductivity of quenched alkali niobate and tantalate glasses," Journal of Applied Physics, vol. 49, No. 9, pp. 4808-4811 (1978).

* cited by examiner

AMORPHOUS LITHIUM LANTHANUM TITANATE THIN FILMS MANUFACTURING METHOD

REFERENCE TO RELATED APPLICATION

Applicant claims the benefit of U.S. Provisional Patent Application Ser. No. 60/947,016 filed Jun. 29, 2007.

TECHNICAL FIELD

This invention relates generally to the manufacturing of amorphous lithium lanthanum titanate thin films, and especially for the manufacturing of amorphous lithium lanthanum titanate thin films that may be used as an electrolyte or composite cathode electrode.

BACKGROUND OF THE INVENTION

The need for a high performance and reliable energy source is well understood. Lithium batteries represent a very attractive solution to these energy needs due to their superior energy density and high performances. Lithium batteries having solid electrolytes offer significant advantages over other lithium battery families because of the elimination of fear of electrolyte instability and combustion, a wider operating temperature range, and relative ease of miniaturization. The solid electrolyte is generally applied in thin film form to minimize losses in the electrolyte. Currently, the most widespread solid lithium electrolyte is $Li_{3.3}PO_{3.9}N_{0.17}$ (LiPON). However, LiPON electrolytes are sensitive to moisture and oxygen in ambient air and as such limits their applicability.

Lithium lanthanum titanate (LLTO) has been identified as an attractive alternative to LiPON electrolytes. Currently, the $La_{0.5}Li_{0.5}TiO_3$ form of LLTO and its cation deficient modifications have been found to have high lithium ion conductivity. Despite all crystalline LLTO modifications having high conductivity, they turn out to be unstable for lithium solid film battery applications because they are unstable in contact with lithium metal anodes. This instability manifests itself in the crystalline LLTO electrolytes becoming an electronic conductor when in contact with lithium metal due to $Li^+$ ion insertion into the LLTO electrolyte. This effect is facilitated by the presence of spatially extended electronic states in the crystalline LLTO electrolyte. Amorphous versions of LLTO electrolytes typically do not exhibit the electronic conduction instability of the crystalline LLTO electrolytes while maintaining the high lithium ion conductivity of its crystalline counterpart.

Amorphous LLTO electrolyte thin films have been prepared using pulsed laser deposition (PLD) techniques from crystalline targets. Measured lithium conductivities of these amorphous LLTO electrolyte samples are at least an order of magnitude higher than LiPON electrolytes conductivity and range for 1E-5 to 1E-3 S/cm$^{-1}$ Stability of the amorphous LLTO electrolyte was successfully demonstrated by fabricating a solid lithium ion battery that used amorphous LLTO as its electrolyte, lithium metal as its anode and $LiCoO_2$ as its cathode. This battery was successfully cycled between 4.3 and 3.3V at room temperature. While amorphous LLTO electrolytes show excellent promise as a lithium battery solid electrolyte candidate material, its pulse laser deposition technique method of preparation is not convenient for large scale manufacturing purposes.

It would be beneficial to provide an amorphous LLTO material which may be suitable for use in batteries, or other electrochemical devices or lithium ion conductive systems. Accordingly, it is to the provision of such that the present invention is primarily directed.

SUMMARY OF THE INVENTION

In a preferred form of the invention a method of producing an amorphous lithium lanthanum titanate layer comprises the steps of (a) providing a quantity of polymer; (b) providing a quantity of lanthanum alkoxide; (c) providing a quantity of lithium alkoxide; (d) providing a quantity of titanium alkoxide; (e) mixing the quantities of polymer, lanthanum alkoxide, lithium alkoxide and titanium alkoxide with an alcohol to form a precursor solution; (f) applying the precursor solution to a substrate to form a precursor layer, and (g) heating the precursor layer to form an amorphous lithium lanthanum titanate layer.

DETAILED DESCRIPTION

Figure 1:
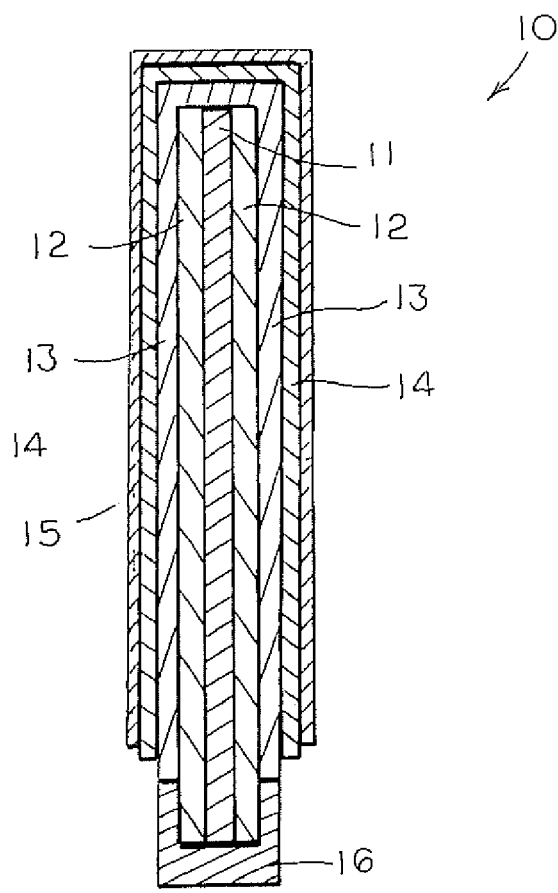
FIG. 1 is a schematic diagram of an air battery embodying principles of the invention in a preferred form.

With reference next to the drawings, there is shown in a battery or electrochemical cell 10. The cell 10 includes a a cathode current collector 11, cathode 12, an electrolyte 13, an anode 14, and an anode current collector 16.

To produce the cell 10 an amorphous lithium lanthanum titanate (LLTO) thin film electrolyte is produced by the sol-gel method. The LLTO electrolyte may be manufactured in the following manner, however, it should be understood that the quantities involved are for exemplary purposes only. The manufacturing commences by introducing 0.05 grams of a polymer, preferably polyvinyl pyrrolidone (PVP), which may be in powder form, into 5 grams of liquid alcohol such as 2-methoxyethanol (2-ME). The solution is allowed to sit for approximately one hour so that the PVP powder is dissolved fully. This produces a first solution.

A second solution is then prepared by mixing approximately 0.868 grams of a lanthanum alkoxide, such as lanthanum methoxyethoxide, previously dissolved in an alcohol, such as 2-methoxyethanol. The lanthanum alkoxide constitutes approximately 10% by weight of the resulting solution while the alcohol constitutes 90% by weight of resulting solution.

Approximately 1 gram of the PVP solution (first solution) is then added to the lanthanum based second solution.

It should be understood that the just described steps of producing first and second solutions has been described because of the ease in obtaining a pre-produced or already dissolved solution containing lanthanum alkoxide. However, it should be understood that the solution resulting from the combination of the first and second solutions could be formed by simply combining the PVP and the lanthanum alkoxide in alcohol to form the resulting solution. Furthermore, it should be understood that the sequence of the mixing of polymer, lanthanum alkoxide, lithium alkoxide and titanium alkoxide is not important to the invention, as these components may be added to the alcohol in any sequence or simultaneously.

Approximately 0.11 grams of a lithium alkoxide, such as lithium butoxide, and approximately 1.21 grams of a titanium alkoxide, such as titanium propoxide, are then also added to the lanthanum based second solution. This process produces an approximately 10 to 11 grams batch of LLTO precursor solution. The amount of PVP is nominally 1% of PVP in the solid LLTO material free of the liquids, either solvents or products of the LLTO synthesis process.

The LLTO precursor solution is applied or otherwise coated on a substrate, such as a gold foil or cathode for a lithium battery, to form a precursor layer, coating or film. The coating techniques that may be used include spin coating, spraying, casting, dripping, and the like, however, the spin coating technique is the preferred method recited herein.

The spin coating process steps commence with spin coating the LLTO precursor solution at 5,000 rpms for 10 seconds. The freshly deposited LLTO coating and substrate are then placed in a closed container saturated by 2-ME vapors for a time period of 15 minutes. The 2-ME saturation is achieved by keeping an open dish containing 2-ME within the closed container. The LLTO coating and substrate and then moved to another closed container, without 2-ME therein, and left for approximately one hour. The LLTO coating and substrate are then heated to approximately 80 degrees Celsius for approximately 15 to 30 minutes in ambient air. The LLTO coating and substrate are then heated to approximately 300 degrees Celsius for approximately 15 to 30 minutes in ambient air and subsequently heated to approximately 350 to 600 degrees Celsius for approximately 15 to 30 minutes in ambient air. It should be understood that the drying times may be varied in accordance with different temperatures.

The just described spin coating process results in a material layer having a thickness in the range of approximately 100 to 150 nm. However, it should be understood that thicker films or layers may be formed by repeating the basic spin coating processing steps multiple times in order to achieve a multi-layer film having the desired thickness.

Figure 3:
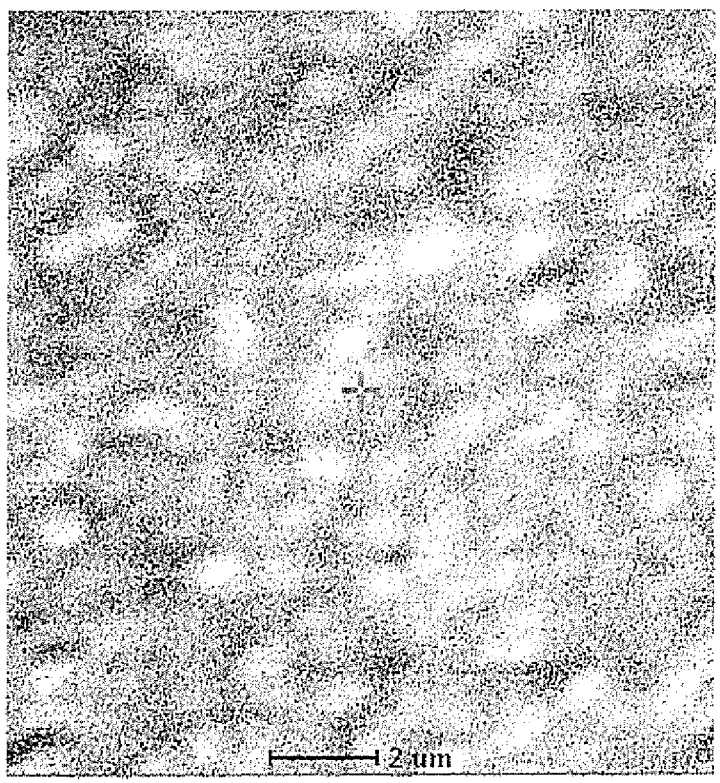
FIG. 3 is an SEM image of an amorphous lithium lanthanum titanate thin film layer produced of FIG. 1.
Figure 2:
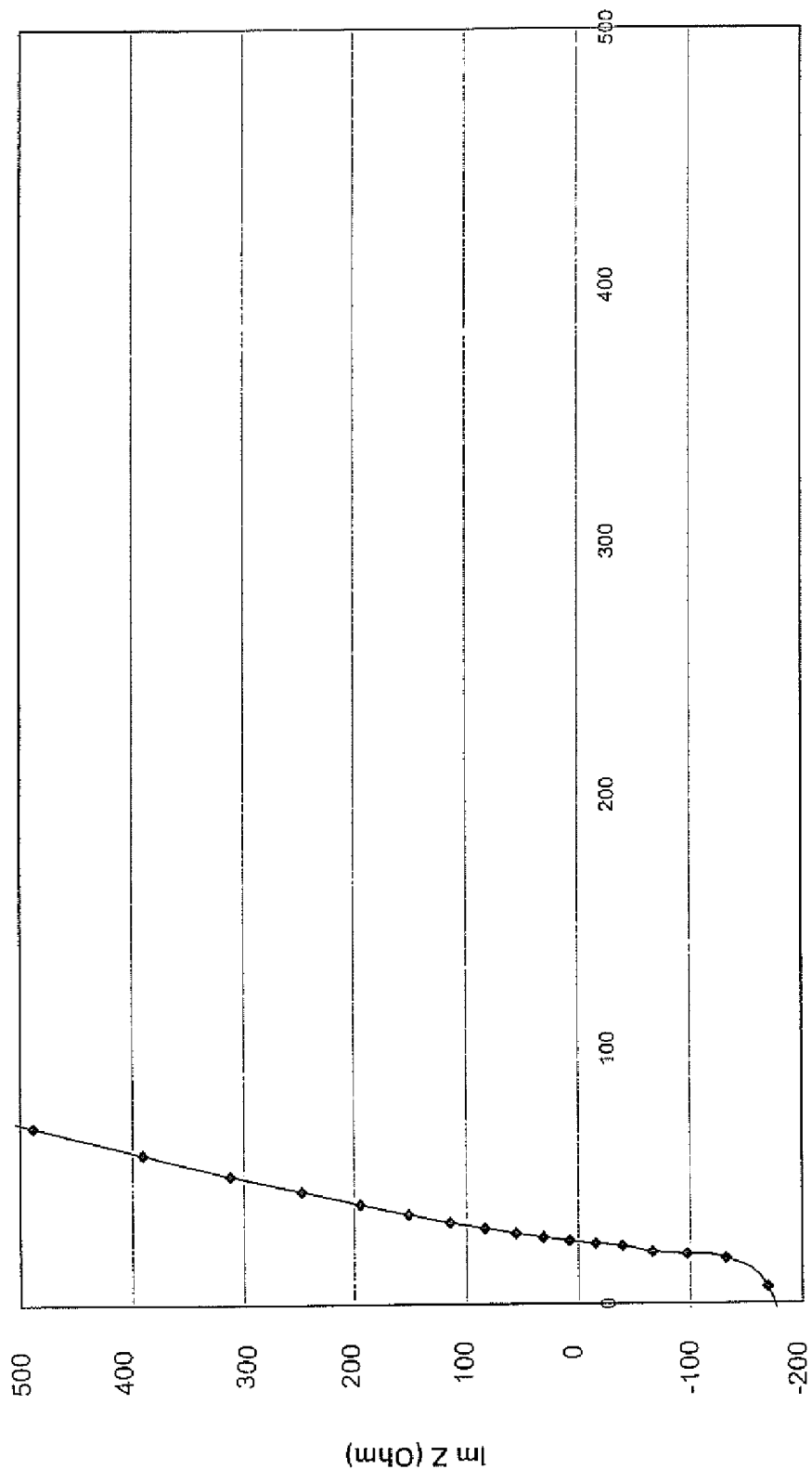
FIG. 2 is a Nyquist plot of an amorphous lithium lanthanum titanate thin film layer produced of FIG. 1.

A sample layer was produced in the just described manner which showed high lithium ion conductivity of approximately 1E-4. FIG. 2 illustrates a Nyquist plot of the amorphous LLTO sample. The graph illustrates the desired impedance with the layer acting as a good ionic conductor. FIG. 3 is an SEM image of the layer produced upon a gold substrate. The SEM image shows that the produced sample was essentially void of cracks, a problem associated with the prior art thin films.

It should be understood that an amorphous LLTO layer is believed to be an improvement over the prior art crystalline LLTO layer, since the amorphous layer appears to provide greater characteristics for electrochemical conversion systems, such as batteries, such as better lithium ion conductivity.

The LLTO precursor solution could also be used as an alternative to prior art liquid electrolytes. As such, the LLTO precursor solution would allowed to permeate the cathode and allowed to dry. The LLTO precursor solution would thus enhance the ability of ions to move through the cathode. Alternatively, the LLTO precursor solution could be dried to obtain a powder and the powder would then be mixed with the solid cathode components and a liquid solution used to fill the leftover pores. As another alternative, the cathode components could be mixed with the LLTO precursor solution to form a cathode. Lastly, the precursor solution may be thickened (increased viscosity) by solvent evaporation in an inert atmosphere and heated. The resulting solution is used to permeate the initial cathode material.

It should be understood that as an alternative to the PVP other polymers may be utilized, such as polyvinyl butyral (PVB). Similarly, alternatives to the 2-ME include butanol, propanol, methoxypropanol, propoxyethanol, glycol ethers, and others. Alternatives to the lanthanum methoxyethoxide include lanthanum propoxide and lanthanum ethoxide. Alternatives to the lithium butoxide include lithium methoxide and lithium propoxide. Lastly, alternatives to the titanium propoxide include titanium butoxide and titanium ethoxide.

It thus is seen that a simple method of manufacturing an amorphous lithium lanthanum titanate thin film by sol-gel method is now provided. It should of course be understood that many modifications may be made to the specific preferred embodiment described herein, in addition to those specifically recited herein, without departure from the spirit and scope of the invention as set forth in the following claims.

The invention claimed is:

1. A method of producing an amorphous lithium lanthanum titanate layer comprising the steps of:
   (a) providing a quantity of polymer;
   (b) providing a quantity of lanthanum alkoxide;
   (c) providing a quantity of lithium alkoxide;
   (d) providing a quantity of titanium alkoxide;
   (e) mixing the quantities of polymer, lanthanum alkoxide, lithium alkoxide and titanium alkoxide with an alcohol to form a precursor solution;
   (f) applying the precursor solution to a substrate to form a precursor layer, and
   (g) heating the precursor layer to form an amorphous lithium lanthanum titanate layer.

2. The method of claim 1 wherein step (a) the polymer is selected from the group consisting of polyvinyl pyrrolidone and polyvinyl butyral.

3. The method of claim 2 wherein step (e) the alcohol is selected from the group consisting of s 2-methoxyethanol, butanol, propanol, methoxypropanol, propoxyethanol, and glycol ethers.

4. The method of claim 1 wherein step (e) the alcohol is selected from the group consisting of s 2-methoxyethanol, butanol, propanol, methoxypropanol, propoxyethanol, and glycol ethers.

5. The method of claim 1 wherein step (b) the lanthanum alkoxide is selected from the group consisting of lanthanum methoxyethoxide, lanthanum propoxide, and lanthanum ethoxide.

6. The method of claim 2 wherein step (b) the lanthanum alkoxide is selected from the group consisting of lanthanum methoxyethoxide, lanthanum propoxide, and lanthanum ethoxide.

7. The method of claim 1 wherein step (c) the lithium alkoxide is selected from the group consisting of lithium butoxide, lithium methoxide, and lithium propoxide.

8. The method of claim 2 wherein step (c) the lithium alkoxide is selected from the group consisting of lithium butoxide, lithium methoxide, and lithium propoxide.

9. The method of claim 1 wherein step (d) the titanium alkoxide is selected from the group consisting of titanium propoxide, titanium butoxide and titanium ethoxide.

10. The method of claim 2 wherein step (d) the titanium alkoxide is selected from the group consisting of titanium propoxide, titanium butoxide and titanium ethoxide.

11. The method of claim 7 wherein step (d) the titanium alkoxide is selected from the group consisting of titanium propoxide, titanium butoxide and titanium ethoxide.

12. The method of claim 1 further comprising the step (h) electrically coupling the amorphous lithium lanthanum titanate layer between a cathode and an anode.

13. A method of producing an amorphous lithium lanthanum titanate battery electrolyte layer comprising the steps of:
   (a) mixing a quantity of polymer with a quantity of alcohol;

(b) mixing a quantity of lanthanum alkoxide with the quantity of alcohol;
(c) mixing a quantity of lithium alkoxide with the quantity of alcohol;
(d) mixing a quantity of titanium alkoxide with the alcohol;
(e) mixing the polymer, lanthanum alkoxide, lithium alkoxide, titanium alkoxide, and alcohol to form a precursor solution;
(f) applying the precursor solution to a substrate to form a precursor layer;
(g) drying the precursor layer to a dry state to form an amorphous lithium lanthanum titanate electrolyte layer, and
(h) electrically coupling the amorphous lithium lanthanum titanate layer between a battery cathode and a battery anode.

14. The method of claim 13 wherein step (a) the polymer is selected from the group consisting of polyvinyl pyrrolidone and polyvinyl butyral.

15. The method of claim 14 wherein step (a) the alcohol is selected from the group consisting of s 2-methoxyethanol, butanol, propanol, methoxypropanol, propoxyethanol, and glycol ethers.

16. The method of claim 13 wherein step (a) the alcohol is selected from the group consisting of s 2-methoxyethanol, butanol, propanol, methoxypropanol, propoxyethanol, and glycol ethers.

17. The method of claim 13 wherein step (b) the lanthanum alkoxide is selected from the group consisting of lanthanum methoxyethoxide, lanthanum propoxide, and lanthanum ethoxide.

18. The method of claim 14 wherein step (b) the lanthanum alkoxide is selected from the group consisting of lanthanum methoxyethoxide, lanthanum propoxide, and lanthanum ethoxide.

19. The method of claim 13 wherein step (c) the lithium alkoxide is selected from the group consisting of lithium butoxide, lithium methoxide, and lithium propoxide.

20. The method of claim 14 wherein step (c) the lithium alkoxide is selected from the group consisting of lithium butoxide, lithium methoxide, and lithium propoxide.

21. The method of claim 13 wherein step (d) the titanium alkoxide is selected from the group consisting of titanium propoxide, titanium butoxide and titanium ethoxide.

22. The method of claim 14 wherein step (d) the titanium alkoxide is selected from the group consisting of titanium propoxide, titanium butoxide and titanium ethoxide.

23. The method of claim 19 wherein step (d) the titanium alkoxide is selected from the group consisting of titanium propoxide, titanium butoxide and titanium ethoxide.

24. The method of claim 13 wherein step (g) the precursor layer is dried by applying heat to the precursor layer.

25. A method of producing an amorphous lithium lanthanum titanate layer comprising the steps of:
(a) mixing a quantity of polymer with a quantity of alcohol to form a first solution;
(b) mixing a quantity of lanthanum alkoxide with a quantity of alcohol to form a second solution;
(c) mixing a quantity of the first solution with the second solution;
(d) mixing a quantity of lithium alkoxide with the second solution;
(e) mixing a quantity of titanium alkoxide with the second solution, the combination of the second solution with the amount of first solution, lithium alkoxide and titanium alkoxide forming a precursor solution;
(f) applying the precursor solution to a substrate to form a precursor layer, and
(g) drying the precursor layer to form an amorphous lithium lanthanum titanate layer.

26. The method of claim 25 wherein step (a) the polymer is selected from the group consisting of polyvinyl pyrrolidone and polyvinyl butyral.

27. The method of claim 25 wherein step (b) the lanthanum alkoxide is selected from the group consisting of lanthanum methoxyethoxide, lanthanum propoxide, and lanthanum ethoxide.

28. The method of claim 25 wherein step (d) the lithium alkoxide is selected from the group consisting of lithium butoxide, lithium methoxide, and lithium propoxide.

29. The method of claim 25 wherein step (e) the titanium alkoxide is selected from the group consisting of titanium propoxide, titanium butoxide and titanium ethoxide.

30. The method of claim 25 further comprising the step (h) electrically coupling the amorphous lithium lanthanum titanate layer between a cathode and an anode.

* * * * *